Jan. 18, 1944.   A. STEIG ET AL   2,339,660
APPARATUS FOR MECHANICAL BRAZING OF DIAMONDS
Filed March 13, 1943   2 Sheets-Sheet 1
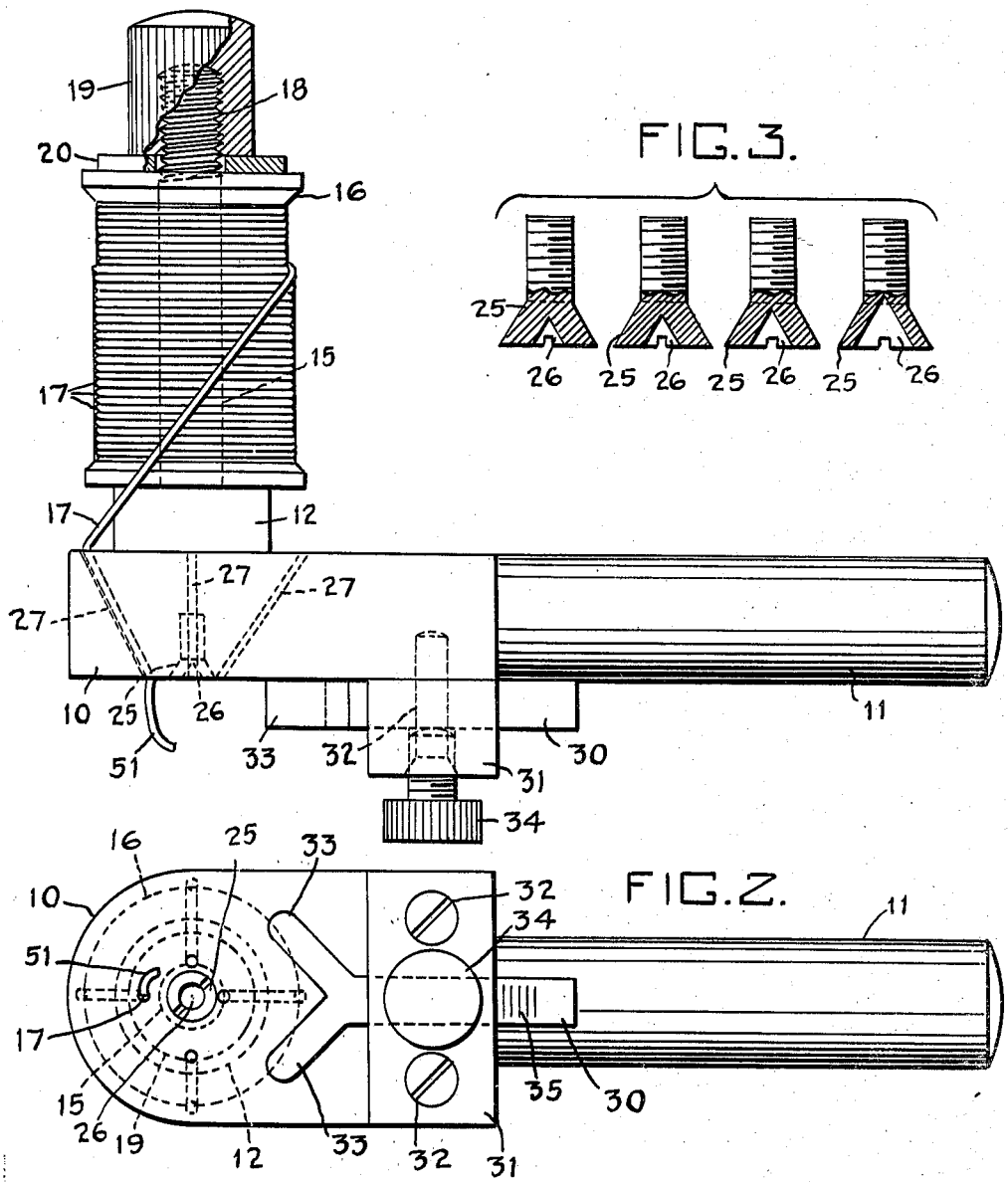
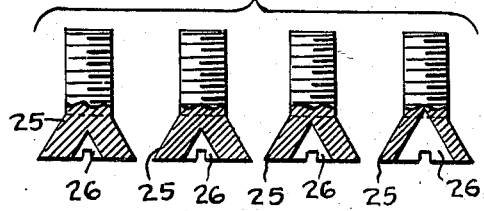
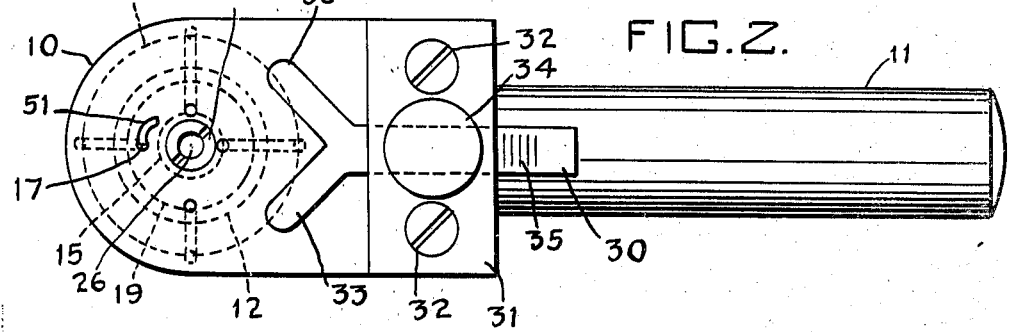
INVENTORS
ARTHUR STEIG
HENRY STEIG
BY
ATTORNEY

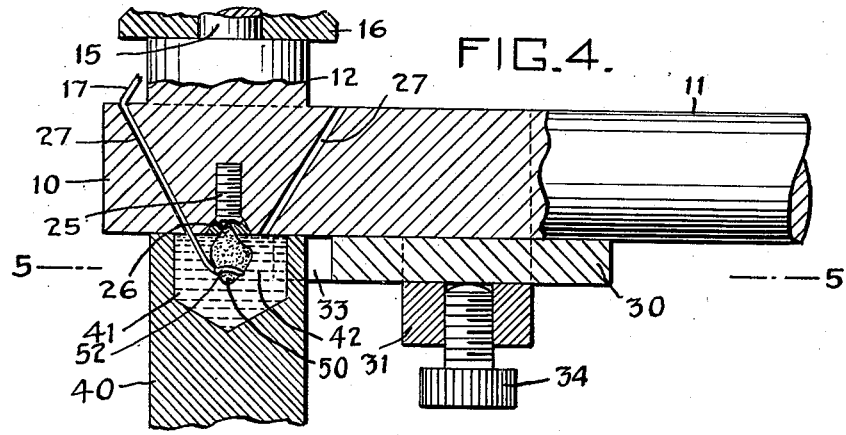
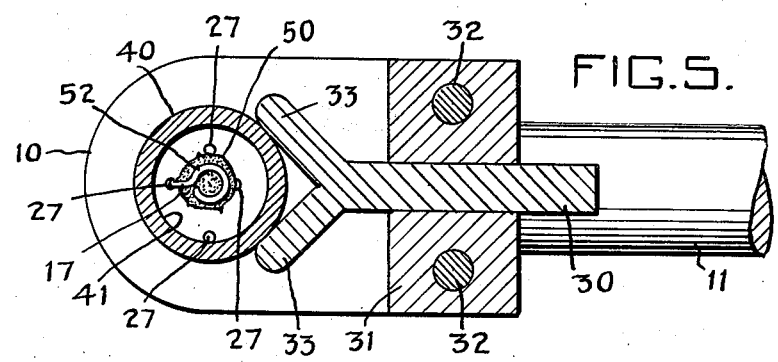
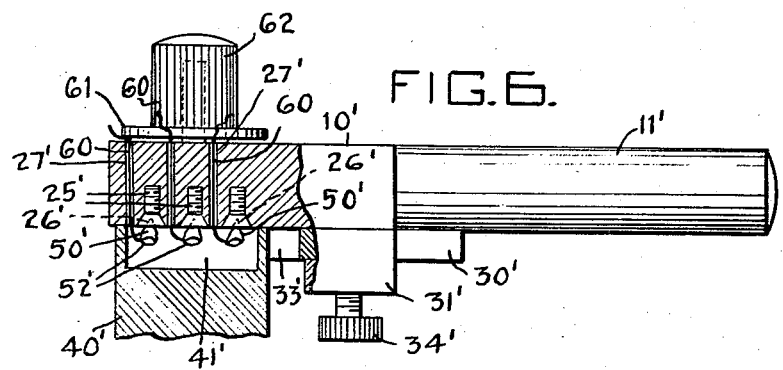
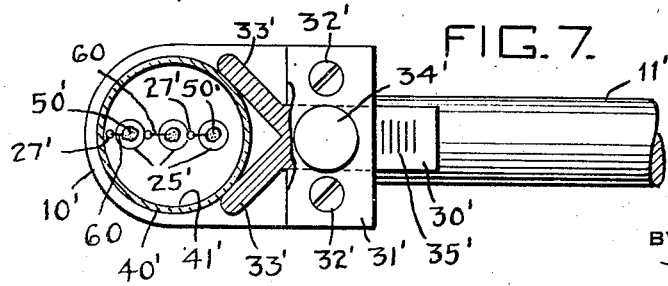
INVENTORS
ARTHUR STEIG
HENRY STEIG

Patented Jan. 18, 1944

2,339,660

UNITED STATES PATENT OFFICE 2,339,660

APPARATUS FOR MECHANICAL BRAZING OF DIAMONDS

Arthur Steig and Henry Steig, New York, N. Y.

Application March 13, 1943, Serial No. 479,134

6 Claims. (Cl. 76—1)

The invention relates to an apparatus for mechanical brazing of diamonds and is particularly adapted for use in the preparation of diamond cutting tools of which a great many are used in various industries.

The precious stones in cutting tools are set by different methods such as brazing, molding, casting, sintering or other means.

One of the most popular methods is the brazing process and as universally practised for a great many years and also at the present time is a hand method in its entirety. It involves manipulation with tweezers which is a painstaking operation requiring considerable time and skill, and usually causes harm to the diamond by the prolonged application of heat.

One of the objects of the invention is to provide a device by which a much faster setting of the stones is accomplished thus effecting a great saving in labor costs and resulting in greatly increased production.

Another object of the invention is to provide an apparatus in which a much surer and more accurate positioning of the diamonds is guaranteed over the present hand brazing methods.

A further important object is that tools made in accordance with the present invention will have a longer life because of the subjection of the diamond to a minimum amount of heat during the brazing process.

In addition to the foregoing other objects and advantages will present themselves as the specification proceeds. Referring to the drawings forming a part thereof and in which preferred embodiments of the invention are illustrated:

Fig. 1 is a side elevation with parts broken away of the improved device;

Fig. 2 is a bottom plan view;

Fig. 3 is a bracketed view of a group of interchangeable screws having different sized seats to accommodate diamonds of different sizes;

Fig. 4 is a fragmentary longitudinal sectional view with the tool in position in the device and the diamond being held in position to be brazed into the tool;

Fig. 5 is a fragmentary sectional plan view taken on line 5—5 of Fig. 4;

Fig. 6 is a side elevation partly in section of a device for making a cluster tool; and Fig. 7 is a bottom plan view with parts in section of the device illustrated in Fig. 6;

Referring again to the drawings and particularly to Figs. 1 to 5, the reference numeral 10 designates the body portion of the setting apparatus to which is secured or formed integral therewith a handle 11 for ease of manipulation. If desired a suitable jig could be provided to support the apparatus.

A boss 12 is formed integral with the body portion or suitably secured thereto and this boss has an upwardly projecting stud 15 upon which is mounted a spool 16 having wire 17 wound thereon. The upper end of the stud 16 is threaded at 18 for the reception of a cap screw 19. A washer 20 is interposed between the upper end of the spool 16 and the cap screw 19. Tightening of the cap screw 19 will lock the spool 16 against rotation and the purpose of this will be hereinafter apparent.

A flat head machine screw 25 is threaded into the under side of the body portion 10 and is provided with a conical seat 26 for the reception of the diamond.

In order that the same apparatus may be used for different sized diamonds a group of interchangeable screws is provided as illustrated in Fig. 3. It will be noted each screw has a different sized seat to accommodate diamonds of varying sizes thus giving the apparatus a wide range of action. The rim of the flat head screw surrounding the seat may be provided with the usual kerf for removing and positioning the screw.

Angularly disposed wire threading holes 27 have their lower ends opening adjacent the seat 26. It will be noted each one of the holes or channels 27 terminate at different distances from the central axis of the screw containing the seat. The hole to be used for threading the wire 17 through will depend upon the size of the diamond to be set. For the smallest size diamond the wire will be threaded through the hole terminating closest to the center while for the largest size stone the wire will be threaded through the hole most remote from the center.

Means are provided for accurately positioning the holder into which the diamond is to be brazed and this means is adjustable to compensate for diamond holders of different sizes and shapes. This positioning means comprises a Y-shaped centering member 30 which is slidably mounted in a guide member 31 secured to the under side of the body portion by screws 32. The diverging arms 33 of the centering member are positioned in relation to the center of the seat in accordance with the shape and size of the diamond holder. The centering member is held in its proper position by a set screw 34 and has graduation lines 35 to facilitate its correct positioning.

The diamond holder 40 is prepared in the conventional manner as it would be for hand brazing. A small orifice 41 is drilled in its upper end and this orifice is filled with molten solder 42 into which the diamond is to be brazed.

In the operation of the apparatus a screw 25 having a seat of the proper size is threaded into the setter, the cap screw 19 is loosened and the wire 17 is threaded through the hole 27 which terminates closest to the outside of the diamond 50 when its point has been placed in the seat 26. An end 51 of the wire 17 is left exposed as shown in Fig. 1 and the cap screw 19 is tightened thus firmly holding the exposed end of the wire in position. The end 51 of the wire is then formed into a loop 52 around the body of the diamond as illustrated in Figs. 4 and 5. The diamond thus held at two points, that is between the loop and the seat, is accurately positioned by manipulating the flexible wire, and this positioning may be easily accomplished even with a diamond of very irregular shape.

The centering member 30 having been properly positioned for accommodation of the holder 40, the setter is brought over the holder and the diamond is pressed into the solder. After a lapse of a few seconds, when the solder has hardened, the cap screw 19 is loosened and the wire cut close to the diamond holder. The bit of wire projecting from the setting is removed when the diamond holder is machine-finished on a lathe as in general practice. The wire 17 is preferably made of a material analogous to that of which the solder is formed and the loop 52 of wire left in the solder is fused to it and becomes an integral part of the setting.

The diamond has thus been mechanically brazed and accurately and positively positioned at the true center of the holder. A flat and smooth table is presented in the solder surrounding the stone and the machine work necessary to complete the tool is greatly lessened.

In hand brazing which as heretofore stated has been universally in use for a great many years, the diamond 50 is grasped with a pair of tweezers and positioned in the molten solder with its best cutting point projecting beyond the solder and the end of the tool. The operator depends entirely upon his eye and the skill of his fingers in locating and positioning the stone with the result that the stone is often not located at the true center of the tool and sometimes not firmly embedded in the solder. The solder must be kept molten for a comparatively long period of time while the operator is attempting to properly locate and position the stone. Oftimes it is necessary to reheat and remelt the solder to correct imperfections or to add to the solder for additional strength. Subjecting the diamond to this extreme heat for such a period of time is harmful to the diamond as heretofore described. Due to the hand operation when puddling the solder in positioning the stone the end of the tool becomes mussy and uneven.

Reference will now be had to Figs. 6 and 7 in which a setter for cluster tools is illustrated. Similar reference numerals primed are used to designate similar parts. The body portion 10' has the handle 11' and all parts for positioning the tool holder are the same as those heretofore described.

A plurality of flat headed screws 25' are provided each having its seat 26'. Diamonds 50' are properly positioned in these seats and are held there by loops 52' formed on the ends of individual wires 60 which are threaded through passages 27' in the setter and their upper ends are held by a washer 61 which is clamped in position by a cap screw 62. While the present illustration shows a cluster tool having three diamonds it is obvious that the number of seats and wire threading holes could be increased or differently arranged to provide different types of tools.

The method of operation of the cluster tool is substantially the same as that described in connection with a tool having a single stone and it is thought to be apparent the apparatus will produce a brazed cluster tool in an economical manner and with great accuracy. It has been practically impossible heretofore to make a cluster tool by the hand brazing method, and molding or casting requires more time and more expensive equipment. Sintering requires more time and does not give as accurate positioning of the diamond points.

Changes in details of construction and arrangements of parts such as would occur to one skilled in the art are to be considered as coming within the spirit of the invention as set forth in the appended claims.

We claim:

1. An apparatus for the mechanical setting of stones into cutting tools, said apparatus having in combination, a body portion, seats formed on the under side of said body portion to accommodate the points of the stones to be brazed, wires for holding said stones in said seats, holes in said body portion through which said wires are threaded, and means on the upper side of said body portion for maintaining said wires in position.

2. An apparatus for the mechanical setting of stones into cutting tools, said apparatus having in combination, a body portion, seats formed on the under side of said body portion to accommodate the points of the stones to be brazed, wires for holding said stones in said seats, holes in said body portion through which said wires are threaded, a washer on the upper side of said body portion, and a cap screw for clamping said washer in position to hold the upper ends of said wires.

3. An apparatus for the mechanical setting of stones into cutting tools, said apparatus having in combination, a body portion, a seat formed on the under side of said body portion to accommodate the point of the stone to be brazed, a wire for holding said stone into said seat, a spool upon which said wire is wound carried by said body portion, means for locking said spool against rotation, and means on the under side of said body portion for positioning a diamond holder.

4. An apparatus for the mechanical setting of stones into cutting tools, said apparatus having in combination, a body portion, a seat formed on the under side of said body portion to accommodate the point of the stone to be brazed, a wire for holding said stone into said seat, a hole in said body portion through which said wire is threaded, a spool upon which said wire is wound carried on the upper side of said body portion, a cap screw for locking said spool against rotation, and means on the under side of said body portion for positioning a diamond holder.

5. An apparatus for the mechanical setting of stones into cutting tools, said apparatus having in combination, a body portion, a seat formed on the under side of said body portion to accommodate the point of the stone to be brazed, a wire for holding said stone into said seat, a spool upon which said wire is wound carried by said body portion, means for locking said spool against rotation, a centering member on the under side of said body portion for positioning a diamond holder, and means for adjusting and holding said centering member in different positions in relation to said seat.

6. An apparatus for the mechanical setting of stones into cutting tools, said apparatus having in combination, a body portion, seats formed on the under side of said body portion to accommodate the points of the stones to be brazed, wires for holding said stones in said seats prior to being brazed, and means for maintaining said wires in position.

ARTHUR STEIG.
HENRY STEIG.